(12) United States Patent
Kimura et al.

(10) Patent No.: US 11,178,738 B2
(45) Date of Patent: Nov. 16, 2021

(54) WORKING MACHINE

(71) Applicant: HONDA MOTOR CO., LTD., Tokyo (JP)

(72) Inventors: Yuta Kimura, Wako (JP); Manabu Dobashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 339 days.

(21) Appl. No.: 16/010,756

(22) Filed: Jun. 18, 2018

(65) Prior Publication Data

US 2019/0003698 A1 Jan. 3, 2019

(30) Foreign Application Priority Data

Jun. 29, 2017 (JP) .............................. JP2017-127111

(51) Int. Cl.
| | | |
|---|---|---|
| *E01H 5/09* | (2006.01) | |
| *H05B 45/20* | (2020.01) | |
| *F21V 33/00* | (2006.01) | |
| *F21Y 113/13* | (2016.01) | |

(52) U.S. Cl.
CPC ............. *H05B 45/20* (2020.01); *E01H 5/098* (2013.01); *F21V 33/00* (2013.01); *F21Y 2113/13* (2016.08)

(58) Field of Classification Search
CPC .......... E01H 5/04; E01H 5/098; F21V 33/00; H05B 45/20; B60Q 1/085; F21Y 2113/13
See application file for complete search history.

(56) References Cited

U.S. PATENT DOCUMENTS

| | | | | |
|---|---|---|---|---|
| 10,131,270 | B2* | 11/2018 | Asaoka | .................... B60Q 1/08 |
| 10,183,614 | B1* | 1/2019 | Biswal | .................. B60Q 1/143 |
| 10,421,389 | B2* | 9/2019 | Nagata | ............... G06K 9/00805 |
| 2004/0080938 | A1* | 4/2004 | Holman | ............ G02F 1/133605 |
| | | | | 362/231 |
| 2006/0044818 | A1* | 3/2006 | Amagasa | .................. B60Q 1/28 |
| | | | | 362/514 |
| 2008/0055896 | A1* | 3/2008 | Feldmeier | .............. H05B 31/50 |
| | | | | 362/231 |
| 2009/0196061 | A1* | 8/2009 | Nakamura | ............... B60Q 1/18 |
| | | | | 362/523 |

(Continued)

FOREIGN PATENT DOCUMENTS

| | | |
|---|---|---|
| EP | 2213512 A1 | 8/2010 |
| EP | 2636560 A1 | 9/2013 |

(Continued)

OTHER PUBLICATIONS

European Search Report dated Nov. 2, 2018, 7 pages.

*Primary Examiner* — Jessica H Lutz
(74) *Attorney, Agent, or Firm* — Rankin, Hill & Clark LLP (57) ABSTRACT

A working machine is provided, which can suppress reduction in visibility of a spot illuminated by illuminating light even when an ambient light environment changes. A working machine in which a working unit that performs predetermined work is connected to a machine body that travels is configured to include a headlight that illuminates a traveling direction of the machine body and is capable of color adjustment, a camera that detects a color of an illumination spot P that is illuminated by illuminating light K of the headlight, and a control unit that performs color adjustment of the headlight in accordance with the color detected by the camera.

8 Claims, 4 Drawing Sheets

(56) References Cited

U.S. PATENT DOCUMENTS

| | | | | |
|---|---|---|---|---|
| 2010/0061078 A1* | 3/2010 | Kim | .......................... | F21V 9/30 |
| | | | | 362/84 |
| 2011/0068910 A1* | 3/2011 | Iwai | ...................... | F21S 41/663 |
| | | | | 340/435 |
| 2011/0280026 A1* | 11/2011 | Higgins-Luthman | ....................... | |
| | | | | B60Q 1/085 |
| | | | | 362/466 |
| 2012/0106186 A1* | 5/2012 | Kishimoto | ................ | F21K 9/64 |
| | | | | 362/510 |
| 2013/0241747 A1* | 9/2013 | Hatakeyama | .......... | G08G 1/166 |
| | | | | 340/901 |
| 2013/0258488 A1* | 10/2013 | Hatakeyama | .......... | B60K 35/00 |
| | | | | 359/630 |
| 2014/0003070 A1* | 1/2014 | Nakaya | ................ | F21S 41/675 |
| | | | | 362/466 |
| 2014/0049973 A1* | 2/2014 | Adachi | ................. | B60Q 11/00 |
| | | | | 362/465 |
| 2014/0132407 A1* | 5/2014 | Kumai | ................. | G08G 1/0962 |
| | | | | 340/439 |
| 2014/0312777 A1* | 10/2014 | Shearer | ................. | H05B 45/20 |
| | | | | 315/151 |
| 2015/0007462 A1* | 1/2015 | Cohen | .................... | E01H 5/098 |
| | | | | 37/242 |
| 2015/0107135 A1* | 4/2015 | Fukano | ..................... | E01H 5/04 |
| | | | | 37/234 |
| 2015/0296589 A1* | 10/2015 | Melanson | ............. | H05B 45/46 |
| | | | | 315/151 |
| 2016/0381761 A1* | 12/2016 | Tseng | ..................... | H05B 45/22 |
| | | | | 315/158 |
| 2017/0088042 A1* | 3/2017 | Yomkil | ................. | H05B 45/20 |
| 2017/0192224 A1* | 7/2017 | Logiudice | ............. | F21S 41/663 |
| 2017/0238392 A1* | 8/2017 | Shearer | ................. | H05B 45/20 |
| | | | | 315/153 |
| 2018/0139819 A1* | 5/2018 | Julian | ..................... | H05B 45/20 |
| 2018/0339645 A1* | 11/2018 | Ekkizogloy | ............. | F21S 41/00 |
| 2019/0159317 A1* | 5/2019 | Harada | .................. | H05B 45/20 |
| 2019/0297701 A1* | 9/2019 | Cao | ........................ | H05B 45/20 |
| 2020/0041082 A1* | 2/2020 | Tan | ....................... | H05B 47/105 |

FOREIGN PATENT DOCUMENTS

| | | | | |
|---|---|---|---|---|
| JP | H07-304385 | A | 11/1995 | |
| JP | H10-44860 | | 2/1998 | |
| JP | 2003-231438 | A | 8/2003 | |
| JP | 2005-222441 | A | 8/2005 | |
| JP | 2009-107543 | A | 5/2009 | |
| JP | 2010-036835 | A | 2/2010 | |
| JP | 2014-070366 | | 4/2014 | |
| JP | 2014-162245 | A | 9/2014 | |
| WO | WO-2013173338 A1 * | | 11/2013 | ............. E01H 5/098 |

\* cited by examiner

WORKING MACHINE

INCORPORATION BY REFERENCE

The present application claims priority under 35 U.S.C. § 119 to Japanese Patent Application No. 2017-127111 filed on Jun. 29, 2017. The content of the application is incorporated herein by reference in its entirety.

BACKGROUND OF THE INVENTION

Field of the Invention

The present invention relates to a working machine.

Description of the Related Art

There has been known a snowplow in which an auger as a working unit that performs snow removal work is connected to a machine body that travels. The snowplow of this kind is generally provided with a headlight that illuminates a front in a traveling direction (for example, refer to Japanese Patent Laid-Open No. 2014-70366).

On the other hand, a technique for controlling lighting of headlights of a vehicle such as a passenger car is known. As the technique of this kind, there are a technique for controlling lighting of headlights in accordance with ambient brightness (for example, refer to Japanese Patent Laid-Open No. 10-44860), a technique for detecting light of an oncoming vehicle and switching between high beam and low beam, a technique for orienting the optical axis of a headlight in an operation direction of a steering wheel and the like.

SUMMARY OF THE INVENTION

Incidentally, in snow-removal work, visibility of a spot illuminated by illuminating light (hereinafter, referred to as "an illumination spot") differs depending on a difference between daytime and nighttime, a difference in weather, and a difference in an ambient light environment such as presence or absence of reflection.

For example, when a headlight illuminates a spot illuminated by daytime solar radiation, light of an outdoor lamp or the like, illuminating light becomes less conspicuous. Consequently, a worker can hardly recognize where the illuminating light illuminates, and visibility of the illumination spot is reduced. With the conventional technique for controlling the headlights of a vehicle, it has been difficult to prevent reduction in visibility of the illumination spot like this.

The aforementioned problem occurs commonly to working machines equipped with machine bodies that travel and illumination means that illuminate traveling directions without being limited to a snowplow.

The present invention has an object to provide a working machine that can suppress reduction in visibility of a spot illuminated by illuminating light even when an ambient light environment changes.

An aspect of the present invention is a working machine in which a working unit that performs predetermined work is connected to a machine body that travels, including illumination means that illuminates a traveling direction of the machine body and is capable of color adjustment, color detection means that detects a color of an illumination spot that is illuminated by illuminating light of the illumination means, and control means that performs color adjustment of the illumination means in accordance with the color detected by the color detection means.

According to the aspect of the present invention, even when an ambient light environment changes, and the color of the illumination spot is not conspicuous, the illumination spot is given a conspicuous color by color adjustment of the illumination means, and reduction in visibility can be suppressed.

An aspect of the present invention is the working machine, wherein the control means keeps a hue of the color of the illumination spot at a predetermined hue by the color adjustment.

According to the aspect of the present invention, even when the ambient light environment changes, the hue (a so-called tint) of the color of the illumination spot is kept at the predetermined hue, so that reduction in visibility due to change in the hue of the illumination spot is suppressed.

An aspect of the present invention is the working machine, wherein the control means keeps a chroma of the color of the illumination spot at a predetermined chroma by the color adjustment.

According to the aspect of the present invention, even when the ambient light environment changes, the chroma (a so-called depth in tint) of the color of the illumination spot does not change and is kept at the predetermined chroma, so that reduction in visibility due to change in the chroma of the illumination spot is suppressed.

An aspect of the present invention is the working machine, further including brightness detection means that detects brightness of the illumination spot, wherein the illumination means is capable of light adjustment, and the control means performs light adjustment of the illumination means and increases a light amount of the illuminating light until the brightness reaches a predetermined value or more, when the brightness is below the predetermined value.

According to the aspect of the present invention, even when the brightness of the illumination spot is below the predetermined value, and the brightness of the illumination spot is insufficient, the light amount of the illuminating light of the illumination means is increased by light adjustment, so that reduction in visibility due to insufficiency of brightness is suppressed.

An aspect of the present invention is the working machine, wherein the control means performs color adjustment of the illumination means in accordance with the color detected by the color detection means, when the brightness has the predetermined value or more.

According to the aspect of the present invention, when the brightness has the predetermined value or more, reduction in visibility of the illumination spot is suppressed by color adjustment of the illumination means, so that reduction in visibility is suppressed by the color adjustment without the illumination spot being illuminated with excessive brightness by the illuminating light. Further, a light amount increase of illuminating light K by color adjustment is suppressed, and therefore energy is saved.

An aspect of the present invention is the working machine, wherein the working machine is a snowplow including the working unit that removes snow on a ground.

According to the aspect of the present invention, even on the accumulated snow surface where visibility of the illumination spot tends to be reduced by the ambient brightness, the color of the light of an outside lamp and the like, reduction in visibility of the illumination spot is suppressed.

According to the aspect of the present invention, even when the ambient light environment changes, reduction in visibility of the spot irradiated by the illuminating light is suppressed.

DETAILED DESCRIPTION OF THE PREFERRED EMBODIMENT

Hereinafter, an embodiment of the present invention will be described with reference to the drawings.

Figure 1:
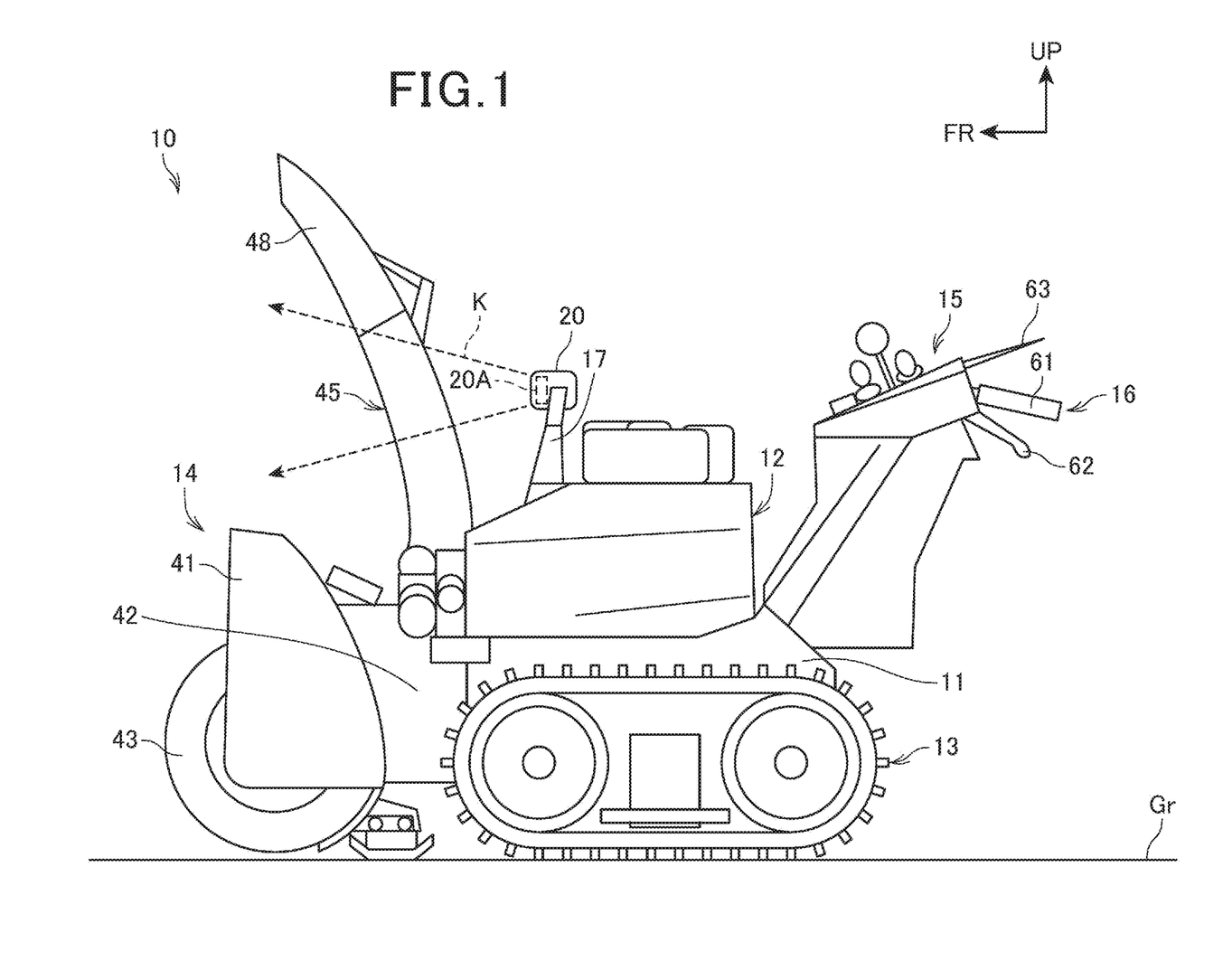
FIG. 1 is a side view of a working machine according to an embodiment of the present invention.
Figure 2:
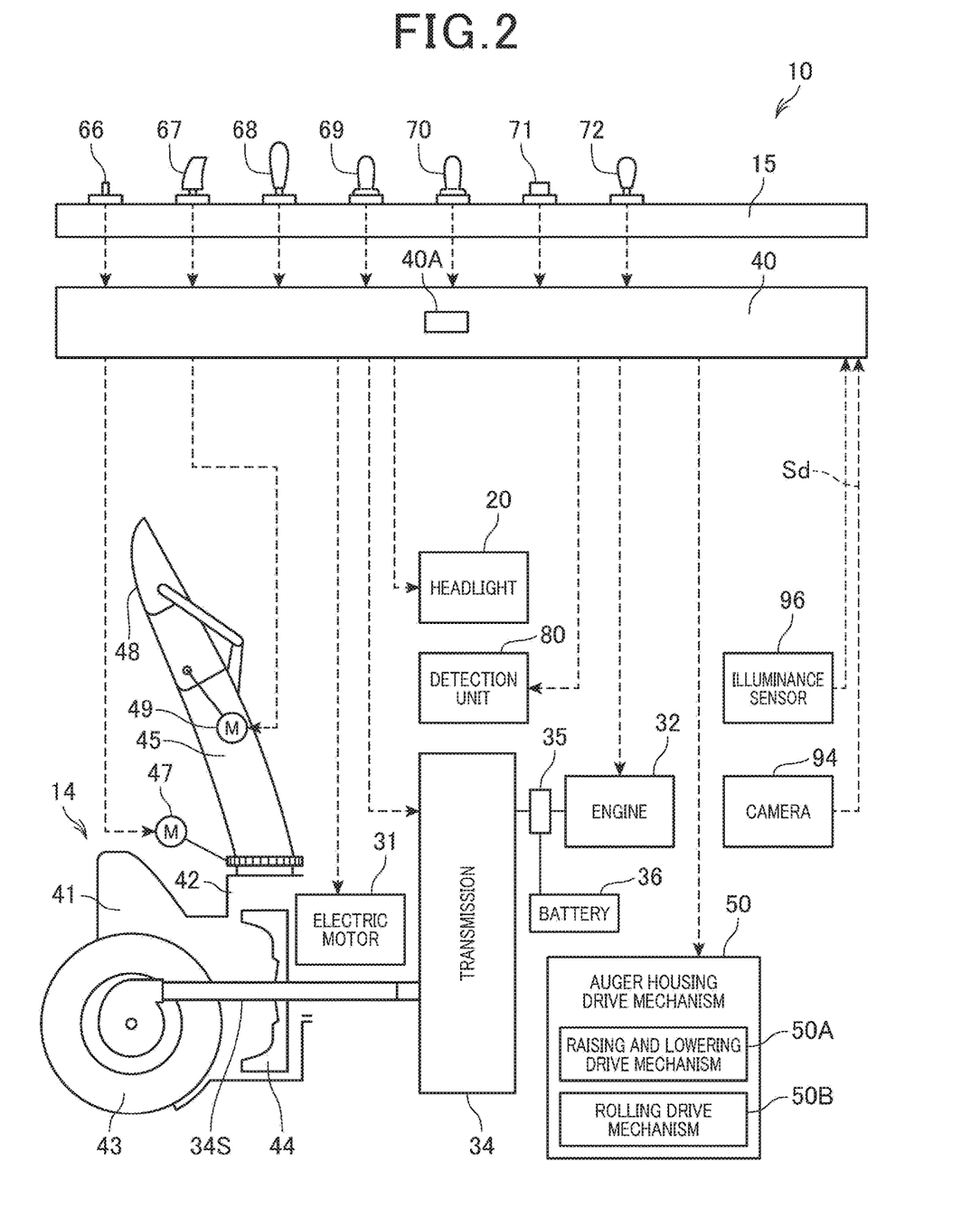
FIG. 2 is a diagram schematically illustrating a configuration of the working machine.

FIG. 1 is a side view of a working machine 10 according to the present embodiment. FIG. 2 is a diagram schematically illustrating a configuration of the working machine 10. Note that statements of respective directions such as a front, a rear, a left, a right and an up and a down are respective directions based on the working machine 10. In FIG. 1, a forward direction is denoted as reference sign FR, and an upward direction is denoted as reference sign UP.

As illustrated in FIG. 1, the working machine 10 is a self-propelled type snowplow in which a machine body 11 is equipped with a power source 12, a travel device 13, a working unit 14 that performs snow-removal work and an operation panel 15 (also referred to as an operation device). An operation handle 16 extending from a rear portion to a rear upper portion of the machine body 11 is provided at the operation panel 15. When a worker carries out snow-removal work by operating the working machine 10, the worker grasps the operation handle 16 behind the working machine 10, manipulates the working machine 10 by operating the operation panel 15 and the like, and walks while accompanying the working machine 10 which travels.

The power source 12 is provided in a center in a front-rear direction of the working machine 10, and from a front upper portion of the power source 12, a pair of arms 17 are vertically provided by being spaced laterally. A headlight 20 that irradiates an illuminating light K is supported at upper ends of the arms 17. The headlight 20 is disposed rearward of the working unit 14 (an auger housing 41, a chute 45 and the like that will be described later) which is connected to a front part of the machine body 11, and upward of the auger housing 41. Further, the headlight 20 is disposed at a position that is deviated in a left direction or a right direction with respect to the chute 45, and is disposed at a central position of a width in a left-right direction of the machine body 11 in the present embodiment. Thereby, the illuminating light K of the headlight 20 can illuminate forward FR (the traveling direction of the working machine 10) of the working machine 10 and the working unit 14 without being shielded by the chute 45.

The power source 12 drives the travel device 13 and the working unit 14, and has an electric motor 31 and an engine 32 illustrated in FIG. 2. The electric motor 31 drives the travel device 13 under control of a control unit 40 illustrated in FIG. 2. In the present configuration, a pair of crawler type travel devices 13 is included by being spaced laterally, and the respective travel devices 13 are driven respectively by the different electric motors 31 via speed reduction mechanisms.

The engine 32 is an internal combustion engine, and drives the working unit 14 via a transmission 34 under the control of the control unit 40. A power generator 35 is provided at a drive shaft of the engine 32. Electric power generated by the power generator 35 is supplied to electric components of the working machine 10, such as a battery 36, the electric motor 31 and the headlight 20. The travel device 13 may be configured to be driven by the engine 32.

As illustrated in FIGS. 1 and 2, the working unit 14 is connected to the front FR of the machine body 11, and includes the auger housing 41, a blower housing 42 that is connected to a rear part of the auger housing 41, an auger 43 provided in the auger housing 41, a blower 44 provided in the blower housing 42, and the above described chute 45 extending to an upward side UP from the blower housing 42.

The auger housing 41 is a cover that covers an upward side UP, a rearward side and both left and right sides of the auger 43, and covers the auger 43 in a state where the front FR and a lower side of the auger 43 are exposed. In the present embodiment, the auger 43 is housed in the auger housing 41 in a posture in which a ground surface Gs thereof is substantially parallel with an upper end edge 41A of the auger housing 41.

As illustrated in FIG. 2, an output shaft 34S of the transmission 34 is connected to the auger 43, and the auger 43 is rotationally driven by rotation of the output shaft 34S, and removes snow by scraping off snow forward FR of the working machine 10. The blower 44 supplies snow which is scraped off by the auger 43 to the chute 45, and shoots the snow to a location away from the working machine 10 by the chute 45, under the control of the control unit 40. That is, the chute 45 functions as a show throwing section that throws the snow scraped together by the auger 43 to the location away from the working machine 10.

The chute 45 is provided rotatably around an axis extending in a perpendicular direction to a ground Gr (corresponding to a travel surface on which the working machine 10 travels) on which the travel device 13 is grounded, and is rotationally driven by a chute drive motor 47. By the chute 45 rotating, a snow throwing direction is adjustable in an arbitrary direction of a forward, rearward, leftward and rightward directions.

A chute guide 48 is provided at an upper end portion of the chute 45. The chute guide 48 is mounted swingably up and down, and is capable of adjusting an angle in the vertical direction (that is, a snow throwing angle). The chute guide 48 has the snow throwing angle controlled by a guide drive motor 49.

As illustrated in FIG. 1, the working machine 10 scrapes together snow by the auger 43 at the front portion while traveling forward by the left and right travel devices 13, and can shoot the snow scraped together to afar via the chute 45 by the blower 44.

The working machine 10 includes an auger housing drive mechanism 50 that changes a posture of the auger housing 41, and the auger housing drive mechanism 50 includes a raising and lowering drive mechanism 50A, and a rolling drive mechanism 50B. The raising and lowering drive mechanism 50A is a mechanism that drives the auger housing 41 to raise and lower the auger housing 41 with respect to the machine body 11 under the control of the control unit 40. The rolling drive mechanism 50B is a mechanism that drives the auger housing 41 to roll the auger housing 41 with respect to the machine body 11 under the control of the control unit 40. Rolling drive is a drive mode that changes an inclination angle ("a rolling angle") in the left-right direction of the ground surface Gs of the auger 43 as the auger 43 is seen from a front side. Thereby, a height of the auger housing 41 is changed, and a direction to the left-right direction is changeable. In this case, the auger 43 moves with the auger housing 41.

The control unit 40 has a processor (for example, CPU or MPU) and a memory 40A (FIG. 2) that stores programs and various data, and the processor controls respective units of the working machine 10 by executing the programs stored in the memory 40A. The control unit 40 is disposed in a vicinity of the operation panel 15.

As illustrated in FIG. 1, the operation handles 16 each has a grip 61 grasped by a worker, and a left and right turn operation levers 62 respectively. Further, the left operation handle 16 has a travel preparation lever 63.

The control unit 40 allows drive of the travel device 13 and the working unit 14 when the worker performs a predetermined operation (an operation of gripping the travel preparation lever 63 and pushing down the travel preparation lever 63 to the grip 61 side). Further, when the worker grips the left or right turn operation lever 62, the control unit 40 controls the travel device 13 to turn the working machine 10 to the direction of the gripped turn operation lever 62.

As illustrated in FIG. 2, the operation panel 15 includes an operator, such as a main switch 66, a throttle lever 67, a direction speed lever 68, an auger housing lever 69, a chute operation lever 70, an auger switch 71, a target work speed setting unit 72 and the like.

The main switch 66 is a manual operator that turns on an electric system, and starts the engine 32. The throttle lever 67 is a manual operator for controlling a rotational speed of the engine 32. The direction speed lever 68 is a manual operator for controlling rotation of the left and right travel devices 13.

The auger housing lever 69 is a manual operator that raises and lowers, and rolls the auger housing 41 in accordance with a snow surface by the auger housing drive mechanism 50 at a time of snow-removal work with the auger 43. The chute operation lever 70 is an operation member for changing orientations of the chute 45 and the chute guide 48 by the chute drive motor 47 and the guide drive motor 49.

The auger switch 71 is a manual operator that switches an electromagnetic clutch not illustrated that is provided in a power transmission route between the auger 43 and the engine 32, and enables power transmission when the auger switch 71 is on, and cuts off the power transmission when the auger switch 71 is off. That is, the control unit 40 drives the auger 43 and the blower 44 by the power of the engine 32 when an operation of lowering the travel preparation lever 63 to the grip 61 side and an operation of turning on the auger switch 71 are performed.

The target work speed setting unit 72 is a manual operator that sets a target work rotational speed of the working unit 14. A snow throwing distance from the chute 45 is determined by a rotational speed of the blower 44, so that when the target work rotational speed of the working unit 14 is set, the snow throwing distance from the chute 45 is set. That is, the target work speed setting unit 72 is also a manual operator (a snow throwing distance lever) that sets the snow throwing distance.

Further, the working machine 10 includes a detection unit 80 (FIG. 2) that detects information necessary for the control unit 40 to control respective parts of the working machine 10.

That is, the detection unit 80 includes sensors for detecting the information on the respective units of the working machine 10 (in the present configuration, a rotational speed of the working unit 14 (a rotational speed of the auger 43), the rotational speed of the engine 32, a height of the auger housing 41, an inclination angle of the auger housing 41 to the gravitational direction (the vertical direction), a rolling position of the auger housing 41 and the like). As for these sensors, sensors of the conventional snowplow are applicable.

Figure 3:
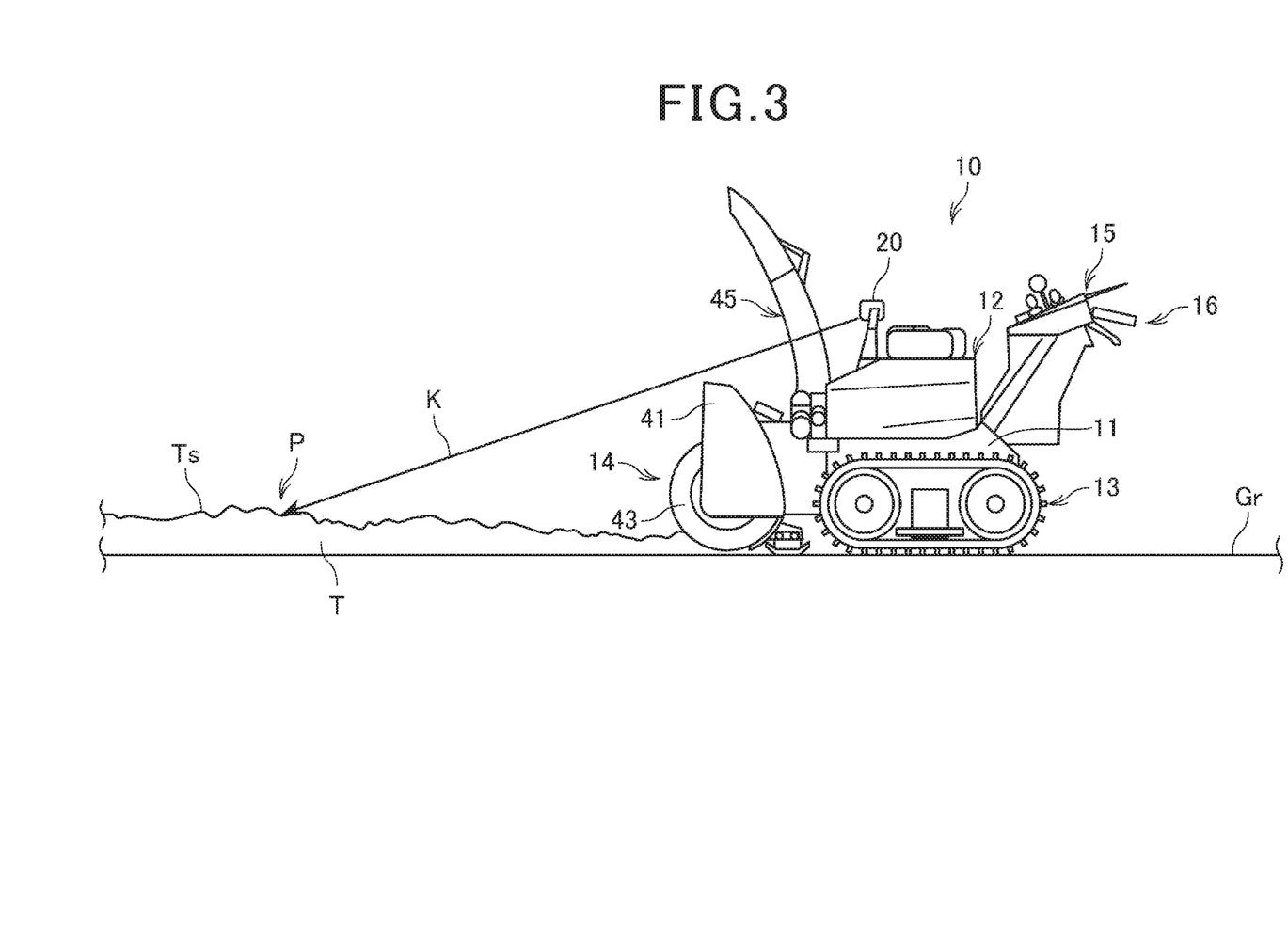
FIG. 3 is an explanatory view of snow-removal work by the working machine.

FIG. 3 is an explanatory view illustrating snow-removal work by the working machine 10.

The working machine 10 lights the headlight 20 and illuminates forward FR with the illuminating light K at the time of snow-removal work. At this time, a way of appearance and feeling at a time when a human being sees an illumination spot P illuminated by the illuminating light K differ depending on a difference in the ambient light environment at that time such as a difference in sunlight irradiation in daytime and nighttime, a difference in weather, presence and absence of reflection. For example, in the case of a bright ambient light environment, even when the illumination spot P is illuminated with the illuminating light K, it is difficult to know which place is illuminated, and visibility of the illumination spot P is reduced.

Thus, in the present embodiment, the working machine 10 is configured to suppress reduction in visibility of the illumination spot P by keeping a color of the illumination spot P illuminated with the illuminating light K constant irrespective of the ambient light environment, and a configuration thereof will be described in detail hereinafter.

As illustrated in FIG. 1, the headlight 20 of the working machine 10 includes a light source device 20A capable of color adjustment and light adjustment by control of the control unit 40. Specifically, the light source device 20A includes a red light source that emits red light, a green light source that emits green light, and a blue light source that emits blue light, and emits light in which the red light, green light and blue light are mixed with a predetermined ratio, and the light is used as the illuminating light K. Color adjustment is performed by the control unit 40 changing the predetermined ratio. Further, the light source device 20A is configured so that respective output light amounts of the red light source, the green light source and the blue light source are controllable independently from one another, and light adjustment is performed by the control unit 40 controlling the respective output light amounts. The above light source device 20A is realized by using a red LED, a green LED and a blue LED for the respective red light source, green light source and blue light source, for example.

Further, as illustrated in FIG. 2, the working machine 10 includes a camera 94 that takes color photographs of the illumination spot P illuminated by the illuminating light K and outputs photographed data Sd to the control unit 40, and an illuminance sensor 96 that detects brightness of the illumination spot P and outputs the brightness to the control unit 40.

The control unit 40 performs color adjustment and light adjustment of the headlight 20 based on ambient brightness, and the photographed data Sd, and thereby suppresses reduction in visibility of the illumination spot P.

Figure 4:
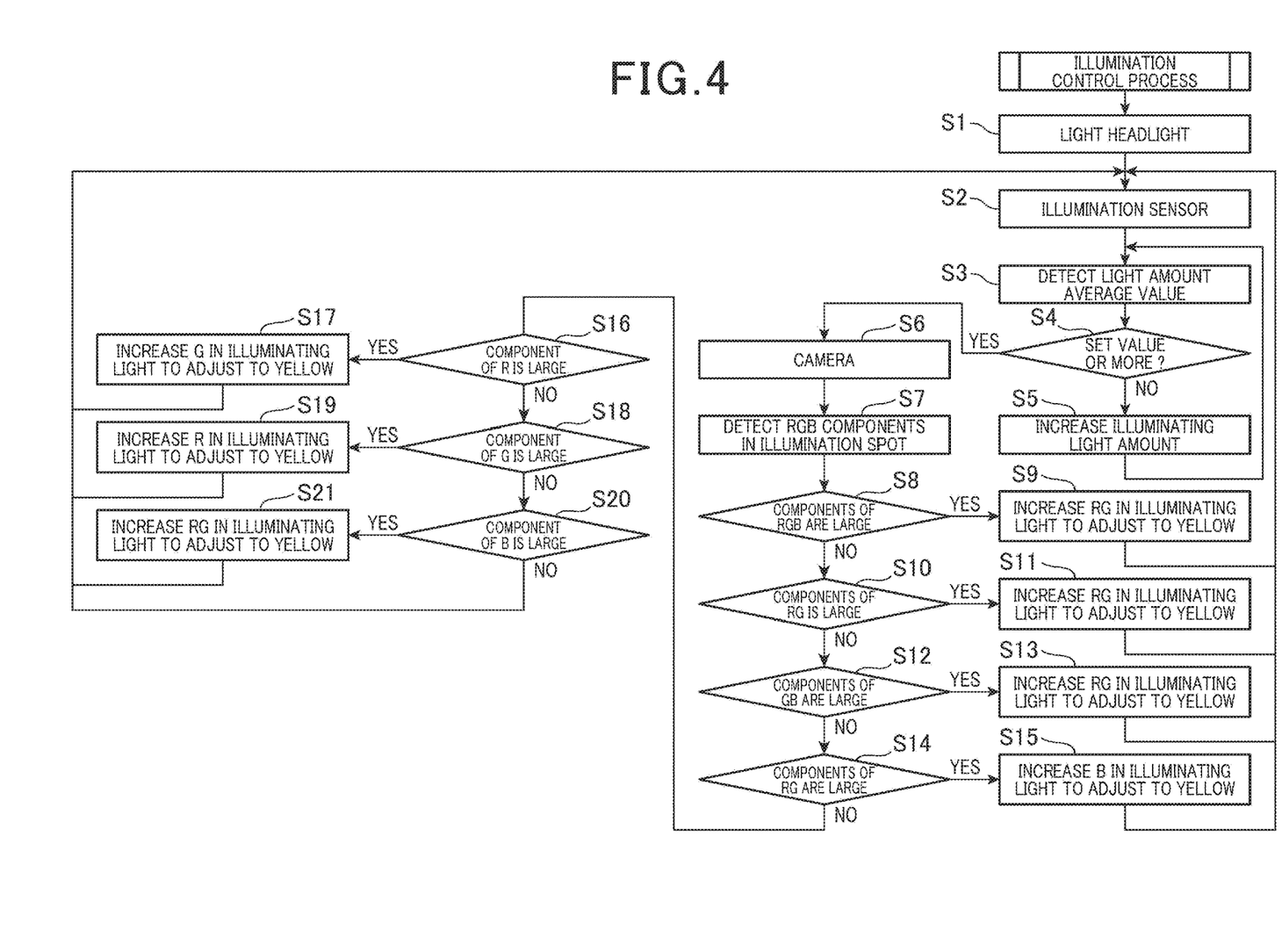
FIG. 4 is a flowchart of an illumination control process of a control unit.

FIG. 4 is a flowchart of an illumination control process of the control unit 40.

When the control unit 40 lights the headlight 20 and starts to illuminate the illumination spot with the illuminating light K based on the operation of a worker, or the ambient brightness (step S1), the control unit 40 takes in a detection light amount (brightness of the illumination spot P) from the illuminance sensor 96 (step S2). Subsequently, the control unit 40 detects a light amount average value (an average value of the brightness) of the illumination spot P (step S3), and compares the light amount average value and a set value (step S4). The set value is an index value of the brightness of the illumination spot P capable of ensuring sufficient visibility, and is set in the control unit 40 in advance.

When the light amount average value is a predetermined set value or less (step S4: NO), the control unit 40 performs light adjustment of the headlight 20, and increases the light amount of the illuminating light K (step S5). Processing in step S5 is repeatedly executed until the light amount average value of the illumination spot P becomes the set value or more by feedback control, and thereby the illumination spot P is kept at brightness that is not below the set value.

When the light amount average value of the illumination spot is the set value or more (step S4: YES), the control unit 40 performs color adjustment instead of light adjustment of the headlight 20.

Describing in detail, when the illumination spot P is bright by sunlight radiation in daytime, light of outdoor lamps or the like, if the illumination spot P is caused to conspicuous by increasing the light amount of the illuminating light K of the headlight 20, the illumination spot P becomes too bright, the worker feels dazzling and visibility is reduced.

Further, the illumination spot P can be made conspicuous by illuminating the illumination spot P with the illuminating light K of a color except for a white color (a yellow belonging to a warm color in the present embodiment). However, when the surroundings are bright with light other than the illuminating light K, the light amount of the illuminating light K becomes relatively small with respect to a light amount of the other light in the illumination spot P. Consequently, even when the illumination spot P is illuminated with the colored illuminating light K, the color by irradiation of the illuminating light K is less conspicuous, and an effect of suppressing reduction in visibility of the illumination spot P is difficult to obtain.

In particular, in snow-removal work, an accumulated snow surface Ts (FIG. 3) of accumulated snow T is close to a white color, so that when the surroundings are bright, the color of the spot illuminated with the illuminating light K is close to the white color of the accumulated snow surface Ts, and it is difficult to distinguish which place is illuminated with the illuminating light K. Further, if the color of the light of an outside lamp is a color except for a white color (an orange color of a sodium lamp, for example), the color of the illumination spot P may become different from the color at the time of being illuminated with only the illuminating light K, due to the color of the light of the outdoor lamp.

Thus, in the present embodiment, a hue (a tint) of the illumination spot P is kept constant irrespective of the ambient light environment, and thereby reduction in visibility of the illumination spot P is prevented.

That is, the control unit 40 takes in the photographed data Sd of the camera 94 (step S6), and detects color components of the illumination spot P based on the photographed data Sd (step S7). Specifically, the control unit 40 decomposes color information of the respective pixels in the photographed data Sd into an R component (a red color component), a G component (a green color component) and a B component (a blue color component). Subsequently, the control unit 40 obtains average values of the R component, the G component and the B component in all the pixels corresponding to the illumination spot P, as color components of the illumination spot P. The hue of the illumination spot P is detected based on a relative ratio of the R component, G component and B component.

Next, the working machine 10 executes processing for keeping the hue of the illumination spot P constant. In the present embodiment, in the light of visibility of the illumination spot P at a time of the accumulated snow surface Ts being illuminated with the illuminating light K, the hue of the illumination spot P is kept yellow.

Specifically, when all of the R component, G component and B component are large, and the hue of the illumination spot P is close to white color (step S8: YES), the control unit 40 performs color adjustment of the headlight 20, increases the R component and the G component, and adjusts the hue to yellow (step S9).

Further, when the R component and the B component are relatively larger than the G component (step S10: YES), the control unit 40 performs color adjustment of the headlight 20, increases the R component and the G component, and adjusts the hue to yellow (step S11). When the G component and the B component are relatively large (step S12: YES), the control unit 40 performs color adjustment of the headlight 20, increases the R component and the G component, and adjusts the hue to yellow (step S13).

Further, when the R component and the G component are relatively large (step S14: YES), the hue of the illumination spot P is yellow, but the yellow is so intense (chroma is so high) that it reduces visibility. Consequently, the control unit 40 performs color adjustment of the headlight 20 to increase the B component, and reduces the chroma (step S15).

When only the R component is relatively large (step S16: YES), the control unit 40 performs color adjustment of the headlight 20, increases the G component, and adjusts the hue to yellow (step S17). When only the G component is relatively large (step S18: YES), the control unit 40 performs color adjustment of the headlight 20, increases the R component and adjusts the hue to yellow (step S19). Further, when only the B component is relatively large (step S20: YES), the control unit 40 performs color adjustment of the headlight 20, increases the RG component and adjusts the hue to yellow (step S21).

The processing of these steps S6 to S21 is repeatedly executed until the color of the illumination spot P is adjusted to yellow of a predetermined chroma by feedback control.

Subsequently, the illumination control process is executed, whereby the illumination spot P is illuminated with a predetermined brightness and with yellow of a predetermined chroma, irrespective of the ambient light environment. As a result, even when the ambient light environment changes, reduction in stimulus that is given to human vision by the illumination spot P is suppressed, and reduction in visibility is restrained.

According to the present embodiment, effects as follows are exhibited.

That is, the working machine 10 of the present embodiment detects the color of the illumination spot P which is illuminated by the illuminating light K of the headlight 20, and performs color adjustment of the headlight 20 in accordance with the color. Thereby, even when the ambient light environment changes, and the color of the illumination spot P is not conspicuous, the illumination spot P is given a conspicuous color by color adjustment of the headlight 20 and reduction in visibility can be suppressed.

The working machine 10 of the present embodiment keeps the hue (a so-called tint) of the color of the illumination spot P at a predetermined hue (yellow in the present embodiment) even when the ambient light environment changes, so that reduction in visibility due to change in the hue of the illumination spot P is suppressed.

The working machine 10 of the present embodiment keeps the chroma (a so-called, depth of tint) of the color of the illumination spot P at a predetermined chroma even when the ambient light environment changes, so that reduction in visibility due to change in the chroma of the illumination spot P is suppressed.

When the brightness of the illumination spot P is below the predetermined value, the working machine 10 of the present embodiment performs light adjustment of the headlight 20 and increases the light amount of the illuminating light K until the brightness reaches the predetermined value or more, so that reduction in visibility due to insufficiency of the brightness is suppressed.

When the brightness of the illumination spot P has the predetermined value or more, the working machine 10 of the present embodiment performs color adjustment of the headlight 20 in accordance with the color of the illumination spot P instead of light adjustment, so that the illumination spot P is not illuminated with excessive brightness by the illuminating light K, and reduction in visibility is suppressed by color adjustment. Further, increase in the light amount of the illuminating light K due to light adjustment is suppressed, so that energy is saved.

The working machine 10 of the present embodiment is a snowplow equipped with the working unit 14 that removes the accumulated snow T on the ground Gr. According to the snowplow, even on the accumulated snow surface Ts where visibility of the illumination spot P tends to be reduced by the ambient brightness, light of an outside lamp, the color of the light and the like, reduction in visibility of the illumination spot is suppressed.

Note that the aforementioned embodiment is only the illustration of one mode of the present invention, and can be arbitrarily deformed and applied within the range without departing from the gist of the present invention.

In the aforementioned embodiment, the working machine 10 keeps the hue of the color of the illumination spot P yellow, but the hue is not limited to this. For example, when the illumination spot P is the accumulated snow surface Ts, a hue of a warm color (for example, light between wavelengths 580 nm and 630 nm) can be favorably used. Further, a proper hue that makes visibility favorable can be used in accordance with a color of a foundation (for example, the ground Gr) of the illumination spot P.

In the aforementioned embodiment, in detection of the color of the illumination spot P, a color sensor may be used instead of the camera 94. The illumination means may be an illumination device for illuminating a proper direction without being limited to the headlight 20.

In the aforementioned embodiment, the snowplow may be of a walking type without being limited to a self-propelled type.

Further, the present invention also can be used in other working machines such as a tiller for use in farm working without being limited to a snowplow.

REFERENCE SIGNS LIST

10 Working machine
11 Machine body
14 Working unit
20 Headlight (illumination means)
20A Light source device
40 Control unit (control means)
94 Camera (color detection means)
96 Illuminance sensor (brightness detection means)
K Illuminating light
P Illumination spot
Ts Accumulated snow surface

What is claimed is:

1. A working machine in which a working unit that performs predetermined work is connected to a machine body that travels, comprising:
   a headlight that illuminates a travel surface on which the working machine travels and which is in a traveling direction of the machine body, said headlight being capable of light adjustment and color adjustment;
   an illuminance sensor that detects brightness of an illumination spot which is on the travel surface and which is illuminated by illuminating light of the headlight;
   a color sensor or camera that detects a color of the illumination spot that is illuminated by illuminating light of the headlight; and
   a controller that has a processor that performs light adjustment of the headlight so that the brightness of the illumination spot is a predetermined value or more and that performs color adjustment of the headlight in accordance with the color detected by the color sensor or the camera to keep the color of the illumination spot illuminated by the illuminating light constant at a predetermined color or a predetermined hue that maintains visibility.

2. The working machine according to claim 1, wherein the controller keeps a chroma of the color of the illumination spot at a predetermined chroma by the color adjustment.

3. The working machine according to claim 1, wherein the controller performs color adjustment of the headlight when performing the light adjustment of the headlight so that the brightness is the predetermined value or more.

4. The working machine according to claim 1, wherein the working machine is a snowplow including the working unit that removes snow on a ground.

5. The working machine according to claim 1, wherein the processor
   obtains, from the camera, photographed data in which the illumination spot illuminated by the illuminating light is color photographed,
   decomposes color information of respective pixels in the photographed data into a red color component, a green color component and a blue color component,
   obtains average values of the red color component, the green color component and the blue color component in all the pixels corresponding to the illumination spot, as color components of the illumination spot to detect a hue of the illumination spot based on a relative ratio of the red color component, the green color component and the blue color component, and
   keeps the hue of the illumination spot constant at the predetermined hue by performing the color adjustment of the headlight to increase one of the red color component, the green color component and the blue color component.

6. The working machine according to claim 4, wherein the processor performs the color adjustment of the headlight to keep a hue of the illumination spot yellow.

7. The working machine according to claim 5, wherein the processor performs the color adjustment of the headlight to keep a hue of the illumination spot yellow.

8. The working machine according to claim 7, wherein the working machine is a snowplow including the working unit that removes snow on a ground.

\* \* \* \* \*